United States Patent
Geller et al.

(10) Patent No.: US 10,252,710 B2
(45) Date of Patent: Apr. 9, 2019

(54) UTILIZING MISSED PREDICTION

(71) Applicant: Toyota Motor Engineering & Manufacturing North America, Inc., Erlanger, KY (US)

(72) Inventors: Benjamin M. Geller, Ann Arbor, MI (US); Joshua D. Payne, Ann Arbor, MI (US); Geoffrey David Gaither, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 184 days.

(21) Appl. No.: 15/591,730

(22) Filed: May 10, 2017

(65) Prior Publication Data

US 2018/0326968 A1    Nov. 15, 2018

(51) Int. Cl.
*B60W 20/11* (2016.01)
*B60W 20/15* (2016.01)
(Continued)

(52) U.S. Cl.
CPC ............ *B60W 20/11* (2016.01); *B60W 10/06* (2013.01); *B60W 10/08* (2013.01); *B60W 20/15* (2016.01);
(Continued)

(58) Field of Classification Search
CPC ...... B60W 20/11; B60W 20/15; B60W 10/06; B60W 10/08; B60W 2420/42;
(Continued)

(56) References Cited

U.S. PATENT DOCUMENTS

| 4,089,564 A | 5/1978 | Oberg |
| 5,432,700 A | 7/1995 | Hrovat et al. |

(Continued)

FOREIGN PATENT DOCUMENTS

| EP | 1030417 A2 * | 8/2000 | ......... H01S 5/06825 |
| EP | 1083643 A2 * | 3/2001 | ........... H01S 5/0683 |

(Continued)

OTHER PUBLICATIONS

Hofstetter et al.; "Sensor Range Sensitivity of Predictive Energy Management in Plug-In Hybrid Vehicles"; IEEE Conference on Control Applications, Sep. 2015 (8 pages).

*Primary Examiner* — Tuan C To
(74) *Attorney, Agent, or Firm* — Snell & Wilmer LLP (57) ABSTRACT

A system includes a power source and a memory to store an event that is predicted to occur, an action to be performed by the power source to increase efficiency of the power source during the stored event, and a mis-prediction counter indicating a count of mis-predictions. The system further includes an ECU designed to predict that the stored event will occur and to control the power source to take the action when the stored event is predicted to occur. The ECU is further designed to update the mis-prediction counter and to adjust at least one of the stored event that is predicted to occur, the stored action to be performed by the power source, or a prediction horizon of the prediction when the mis-prediction counter reaches or exceeds a threshold quantity of mis-predictions to increase efficiency of the power source during a subsequent prediction of the stored event.

20 Claims, 6 Drawing Sheets

(51) Int. Cl.
  *B60W 10/06*    (2006.01)
  *B60W 10/08*    (2006.01)

(52) U.S. Cl.
  CPC ..... *B60W 2420/42* (2013.01); *B60W 2420/52* (2013.01); *B60W 2510/0638* (2013.01); *B60W 2510/0657* (2013.01); *B60W 2510/244* (2013.01); *B60W 2520/105* (2013.01); *B60W 2530/14* (2013.01); *B60W 2550/10* (2013.01); *B60W 2710/0644* (2013.01); *B60W 2710/0666* (2013.01); *B60W 2710/244* (2013.01); *B60W 2720/106* (2013.01)

(58) Field of Classification Search
  CPC ..... B60W 2420/52; B60W 2510/0638; B60W 2510/0657; B60W 2510/244; B60W 2520/105; B60W 2530/14; B60W 2550/10; B60W 2710/0644; B60W 2710/0666; B60W 2710/244; B60W 2720/106
  See application file for complete search history.

(56) References Cited

U.S. PATENT DOCUMENTS

| | | | |
|---|---|---|---|
| 5,646,512 A * | 7/1997 | Beckwith | G05F 1/153 323/211 |
| 5,907,238 A * | 5/1999 | Owerko | H02J 9/005 320/136 |
| 7,424,868 B2 | 9/2008 | Reckels et al. | |
| 8,560,216 B1 | 10/2013 | Kahn et al. | |
| 8,930,058 B1 | 1/2015 | Quist et al. | |
| 9,174,550 B2 | 11/2015 | Koshizen et al. | |
| 9,269,264 B2 | 2/2016 | Shimizu et al. | |
| 9,291,471 B2 | 3/2016 | Ikawa et al. | |
| 9,360,330 B2 | 7/2016 | Uno | |
| 9,469,296 B2 | 10/2016 | Nilsson et al. | |
| 9,493,089 B2 | 11/2016 | Shin et al. | |
| 9,511,668 B2 | 12/2016 | Johansson et al. | |
| 9,539,996 B2 | 1/2017 | Kristinsson et al. | |
| 9,561,804 B2 | 2/2017 | Meyer et al. | |
| 2004/0267807 A1 * | 12/2004 | Barabas | G06F 17/30362 |
| 2006/0155664 A1 * | 7/2006 | Morikawa | G06N 99/005 706/47 |
| 2008/0027587 A1 * | 1/2008 | Nickerson | A01G 25/16 700/284 |
| 2012/0227045 A1 * | 9/2012 | Knauth | G06F 9/3863 718/100 |
| 2012/0288288 A1 * | 11/2012 | Imaizumi | G03G 15/80 399/38 |
| 2012/0303176 A1 * | 11/2012 | Wong | G01S 17/023 701/1 |
| 2013/0328539 A1 * | 12/2013 | King | H02J 1/102 323/299 |
| 2015/0239365 A1 * | 8/2015 | Hyde | B60L 11/1861 701/2 |
| 2016/0236790 A1 * | 8/2016 | Knapp | B64C 11/001 |
| 2017/0331598 A1 * | 11/2017 | Qi | H03M 13/6306 |
| 2018/0091311 A1 * | 3/2018 | Kisley | H04L 9/3252 |

FOREIGN PATENT DOCUMENTS

| | | | | |
|---|---|---|---|---|
| JP | 3551928 B2 * | 8/2004 | | H04W 52/221 |
| JP | 2008260361 | 10/2008 | | |
| KR | 20050007818 A * | 1/2005 | | H03G 3/3047 |

\* cited by examiner

UTILIZING MISSED PREDICTION

BACKGROUND

1. Field

The present disclosure relates to systems and methods for utilizing missed vehicle predictions to enhance future predictions of events.

2. Description of the Related Art

Electronic control systems for vehicles have been increasing in quantity and improving in quality for years. Such control systems may take actions to increase efficiency of the vehicle for various reasons, such as to save fuel cost for the driver, reduce emissions, and the like. Some of these control systems may learn driver behaviors and may control various features of the vehicle based on the learned driver behaviors. For example, a control system may learn preferred acceleration rates of a driver, a deceleration rate of a driver, lane changing habits of a driver, or the like. After learning this information, the control system may predict actions the driver will take in certain situations.

Based on these predictions, the control system may take various actions to improve vehicle operations. However, at times, these predictions may be incorrect and may result in the control system taking an undesirable action. Thus, there is a need for systems and methods for improving vehicle efficiency by utilizing missed predictions.

SUMMARY

Described herein is a system for improving vehicle efficiency of a vehicle. The system includes a power source designed to generate power usable to propel the vehicle. The system also includes a memory designed to store various information. For example, the memory may store an event that is predicted to occur and an action to be performed by the power source to increase efficiency of the power source during the stored event. The memory may also store a mis-prediction counter corresponding to a quantity of times a prediction of the stored event was incorrect. The system further includes an electronic control unit (ECU) coupled to the power source and the memory. The ECU is designed to predict that the stored event will occur. The ECU is further designed to control the power source to take the action when the stored event is predicted to occur. The ECU is further designed to increase the mis-prediction counter if the prediction was inaccurate. The ECU is further designed to adjust at least one of the stored events that is predicted to occur, the stored action to be performed by the power source, or a prediction horizon of the prediction when the mis-prediction counter reaches or exceeds a threshold quantity of mis-predictions. Such adjustment may increase the efficiency of the power source during a subsequent prediction of the stored event.

Also described is a method for improving vehicle efficiency of a vehicle. The method includes generating, by a power source, power to propel the vehicle. The method further includes storing, in a memory, an event that is predicted to occur, an action to be performed by the power source to increase efficiency of the power source during the stored event, and a mis-prediction counter corresponding to a quantity of times a prediction of the stored event was incorrect. The method further includes predicting, by an electronic control unit (ECU), that the stored event will occur. The method further includes controlling, by the ECU, the power source to take the action when the stored event is predicted to occur. The method further includes increasing, by the ECU, the mis-prediction counter if the prediction was inaccurate. The method further includes adjusting, by the ECU, at least one of the stored event that is predicted to occur, the stored action to be performed by the power source, or a prediction horizon of the prediction when the mis-prediction counter reaches or exceeds a threshold quantity of mis-predictions in order to increase the efficiency of the power source during a subsequent prediction of the stored event.

Also described is a system for improving vehicle efficiency of a vehicle. The system includes a power source designed to generate power usable to propel the vehicle. The system further includes a sensor designed to detect data corresponding to an environment of the sensor. The system further includes a memory designed to store various information including a trigger and an event that is predicted to occur when the trigger occurs. The memory is further designed to store an action to be performed by the power source to increase efficiency of the power source during the stored event, and a mis-prediction counter corresponding to a quantity of times a prediction of the stored event was incorrect. The system further includes an electronic control unit (ECU) coupled to the power source, the sensor, and the memory. The ECU is designed to predict that the stored event will occur when the trigger occurs and to control the power source to take the action when the stored event is predicted to occur. The ECU is further designed to analyze the detected data to determine whether the detected data indicates that the stored event is unlikely to occur and to control the power source to take a different action than the stored action in response to determining that the stored event is unlikely to occur. The ECU is further designed to determine whether the prediction of the stored event was accurate by determining whether an actual event fits within a set of bounds defining a correct prediction of the stored event. The ECU is further designed to increase the mis-prediction counter if the prediction was inaccurate. The ECU is further designed to adjust at least one of the stored event that is predicted to occur, the stored action to be performed by the power source, or a prediction horizon of the prediction when the mis-prediction counter reaches or exceeds a threshold quantity of mis-predictions in order to increase the efficiency of the power source after a subsequent detection of the trigger.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for utilizing missed predictions to increase efficiency of vehicles. An exemplary system includes a power source, such as an engine and/or a motor generator. The system also includes a memory that stores information such as predicted events, actions to be taken by the power source when the event is predicted to occur, and mis-prediction counters indicating a number of times a corresponding prediction was incorrect. The system also includes an electronic control unit (ECU). The ECU may monitor the status of the vehicle and predict when a stored event will occur. When the ECU predicts that the stored event will occur, the ECU will control the power source to take the corresponding action stored in the memory. The ECU will further supplement the mis-prediction counter each time the corresponding prediction is incorrect. When the mis-prediction counter reaches a threshold quantity of mis-predictions, the ECU may adjust future predictions of the event, may adjust the stored action to be taken by the power source, or may adjust a prediction horizon of the prediction.

Such a system provides benefits and advantages such as utilizing missed predictions to increase future efficiency of the vehicle. Because the ECU keeps count of the missed predictions, the ECU may determine relatively quickly whether a prediction is invalid. This provides the benefit of predictions having a greater accuracy, as well as the benefit of allowing the vehicle to operate with increased efficiency because of the increased prediction accuracy. The ECU may store data indicating times and/or locations at which mis-predictions occur, advantageously allowing for more accurate predictions that are based on particular times and/or locations. This further increases vehicle efficiency. The system also detects data using various sensors and uses the detected data to determine whether a prediction is likely to be incorrect. This advantageously allows a prediction to be changed for any given instance in which the prediction is likely to be incorrect, allowing the vehicle to be controlled to have increased efficiency for the particular instance. These benefits may further be enhanced if the vehicle is an autonomous vehicle because autonomous vehicles may make more predictions than human-driven vehicles.

The benefits described above may apply equally to hybrid vehicles, conventional vehicles, electric vehicles, fuel cell vehicles, and the like. For example, operation of a hybrid vehicle may be enhanced by determining and taking action in regards to mis-predictions regarding charging of the battery and when to turn on or off the engine. In a similar manner, operation of a conventional vehicle may be enhanced by determining and taking action in regards to mis-predictions regarding shifting of the transmission. An electric vehicle may be enhanced by determining and taking action in regards to mis-predictions regarding boost voltage control.

Figure 1:
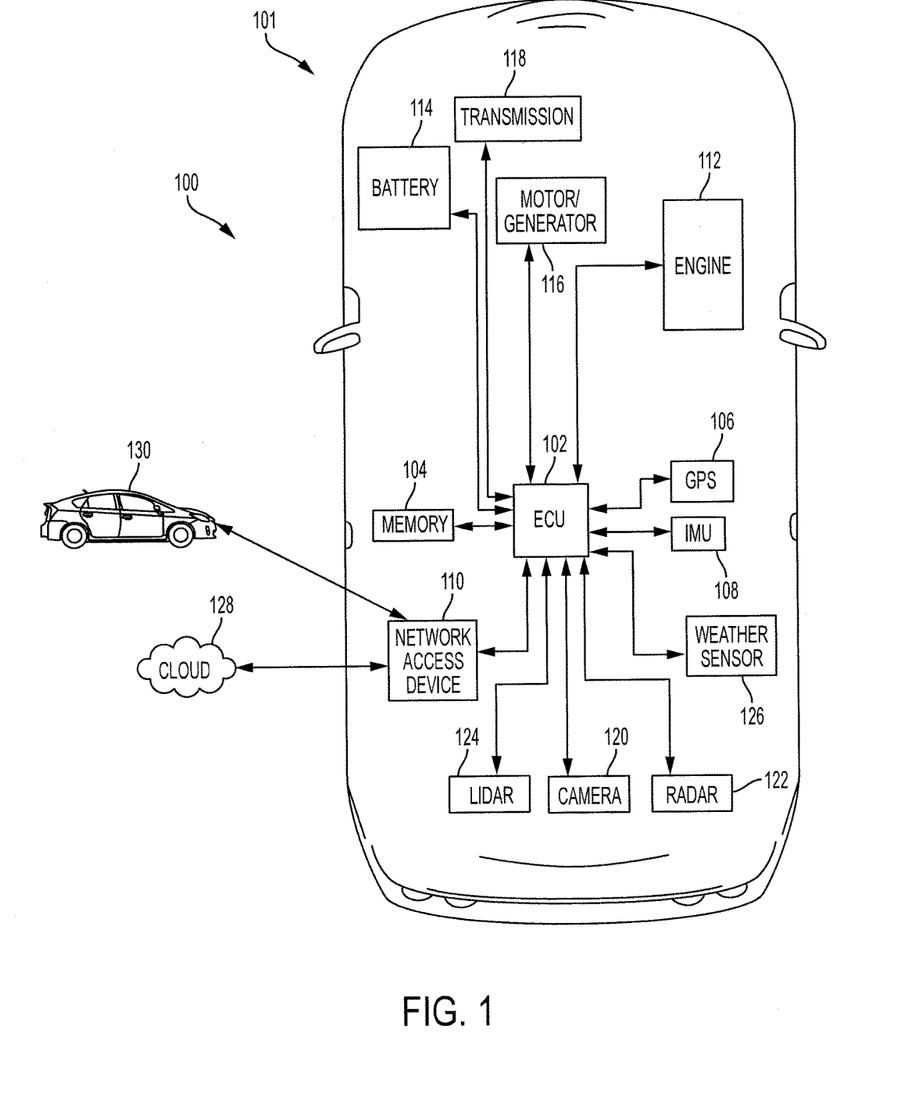
FIG. 1 is a block diagram illustrating various components of a vehicle that includes a system for increasing efficiency of the vehicle based on missed predictions according to an embodiment of the present invention.

Turning to FIG. 1, a vehicle 100 includes components of a system 101 for improving efficiency of the vehicle 100. The vehicle 100 includes an electronic control unit (ECU) 102, a memory 104, a global positioning system (GPS) sensor 106, an inertial measurement unit (IMU) sensor 108, and a network access device 110. The vehicle 100 further includes a power source which may include one or more of an engine 112 or a combination of a battery 114 and a motor generator 116. The vehicle 100 may further include a transmission 118 for applying mechanical energy from the engine 112 or the motor generator 116 to wheels to propel the vehicle 100. The vehicle 100 further includes one or more sensor including a camera 120, a radio detection and ranging (radar) sensor 122, a light imaging, detection, and ranging (LIDAR) sensor 124, and a weather sensor 126.

The ECU 102 may include one or more processors or controllers, which may be specifically designed for automotive systems. The functions of the ECU 102 can be implemented in a single ECU or in multiple ECUs. The ECU 102 may receive data from components of the vehicle 100, may make determinations based on the received data, and may control the operations of the components based on the determinations.

The memory 104 may include any non-transitory memory known in the art. In that regard, the memory 104 may store machine-readable instructions usable by the ECU 102 and may store other data as requested by the ECU 102.

The GPS sensor 106 may be capable of detecting location data corresponding to a location of the vehicle 100. The IMU sensor 108 may detect a velocity or an orientation of the vehicle 100. One or both of the GPS sensor 106 or the IMU sensor 108 may be referred to as a location sensor and may be used to determine a current location, heading, and/or orientation of the vehicle 100.

The network access device 110 may include any port or device capable of communicating via a wired or wireless interface such as Wi-Fi, Bluetooth, a cellular protocol, vehicle to vehicle communications, or the like. For example, the ECU 102 may control the network access device 110 to communicate with a cloud 128, an external vehicle(s) 130, or any other object or device. For example, the network access device 110 may retrieve traffic or weather information from the cloud 128. As another example, the network access device 110 may retrieve data from nearby vehicles 130 such as a speed of the vehicles 130, a quantity of the vehicles 130, a location of the vehicles 130, or the like.

The engine 112 may convert a fuel into mechanical power. In that regard, the engine 112 may be a gasoline engine, a diesel engine, a fuel cell engine, or the like.

The battery 114 may store electrical energy. The motor generator 116 may convert the electrical energy stored in the battery into mechanical power usable by the transmission 118. The motor generator 116 may further convert mechanical power received from the transmission 118 to electrical energy, which may be stored in the battery 114.

The transmission 118 may be coupled to the engine 112 and the motor generator 116. The transmission 118 may include a power splitter and may transfer mechanical power received from one or both of the engine 112 and the motor generator 116 to wheels of the vehicle 100. The transmission 118 may control how much mechanical power is transferred from each of the engine 112 and the motor generator 116.

For example, the ECU 102 may control the transmission 118 to achieve a desired power transfer from each of the engine 112 and the motor generator 116. The transmission 118 may further transfer mechanical energy received from one or both of the engine 112 or wheels of the vehicle 100 to the motor generator 116 for conversion into electrical energy.

The camera 120 may include one or more camera oriented in such a manner as to be able to detect image data corresponding to an environment of the vehicle 100. For example, the camera 120 may include a camera positioned on each end of the vehicle 100 to detect the presence of objects in the environment of the vehicle 100.

The radar sensor 120 may include one or more radar device oriented in such a manner as to be able to detect radar data corresponding to an environment of the vehicle 100. For example, the radar sensor 120 may transmit a radar beam, receive a reflection of the radar beam, and analyze the reflection of the radar beam to determine the presence and characteristics of an object in the environment of the vehicle 100.

The LIDAR sensor 124 may include one or more LIDAR device oriented in such a manner as to be able to detect LIDAR data corresponding to an environment of the vehicle 100. For example, the LIDAR sensor 124 may transmit light, receive a reflection of the light, and analyze the reflection of the light to determine the presence and characteristics of an object in the environment of the vehicle 100. Inclusion of the radar sensor 122 and the LIDAR sensor 124 may be advantageous as the radar sensor 122 may be better suited to detect data in some environmental conditions, while the LIDAR sensor 124 may be better suited to detect data in other environmental conditions.

The weather sensor 126 may include any sensor capable of detecting data corresponding to weather conditions outside of the vehicle 100. For example, the weather sensor 126 may detect an amount of ambient light, may detect an ambient temperature of the environment, may detect moisture in the environment, may detect the presence of clouds, or the like.

In order to control the vehicle 100 to perform in an efficient manner, the ECU 102 may make predictions regarding use of the vehicle in certain situations and may control one or more of the engine 112, the battery 114, the motor generator 116, or the transmission 118 based on the prediction. For example, the ECU 102 may predict that a driver of the vehicle 100 will request that the vehicle 100 be accelerated to 65 miles per hour (mph) while on a highway on-ramp. In that regard, the prediction may be triggered when the vehicle 100 is approaching an on-ramp. As the ECU 102 determines that the vehicle 100 is approaching the on-ramp, the ECU 100 may control the power source to prepare for such acceleration. Such preparation may be performed in order to improve or enhance efficiency of the power source.

The engine 112 may perform most efficiently when operating at a predetermined engine speed and torque. In that regard, when the ECU 102 predicts that the vehicle will accelerate to 65 mph, the ECU 102 may control the engine 112 to turn on and operate at the predetermined engine speed and torque before the predicted acceleration begins. Such operation of the engine 112 may provide more power than necessary for the present operation, and the extra power may be used to charge the battery 114. Accordingly, when the acceleration begins, the engine 112 may continue to operate at the predetermined engine speed and torque and any additional power may be provided by the motor generator 116 using energy stored in the battery 114. Because the engine 112 is continuously operating at the most efficient engine speed and torque, the total efficiency of the vehicle 100 is improved.

Although taking actions in response to predicting upcoming events (such as in the example described above) may increase efficiency of the vehicle 100 (i.e., increased fuel efficiency, efficient use of electrical power, or the like), the efficiency of the vehicle may be reduced when a mis-prediction occurs. A mis-prediction may be an instance in which a predicted event does not occur, a predicted event occurs with different parameters (i.e., the vehicle 100 accelerates as predicted but at a different rate than predicted), a predicted event occurs but the action taken in response to predicting the event results in decreased fuel efficiency, or the like.

The ECU 102 may be designed to account for such mis-predictions. For example, the ECU 102 may count mis-predictions and determine the severity of mis-predictions for various predicted events. If a certain quantity of mis-predictions has occurred (and/or sufficiently severe mis-predictions have occurred) then the ECU 102 may take action such as changing a control associated with the prediction.

Furthermore, data detected by one or more sensor of the vehicle 100 may indicate that a predicted event is unlikely to occur. The ECU 102 may receive the detected data and may take an action other than a stored action that is associated with the predicted event.

Figure 2:
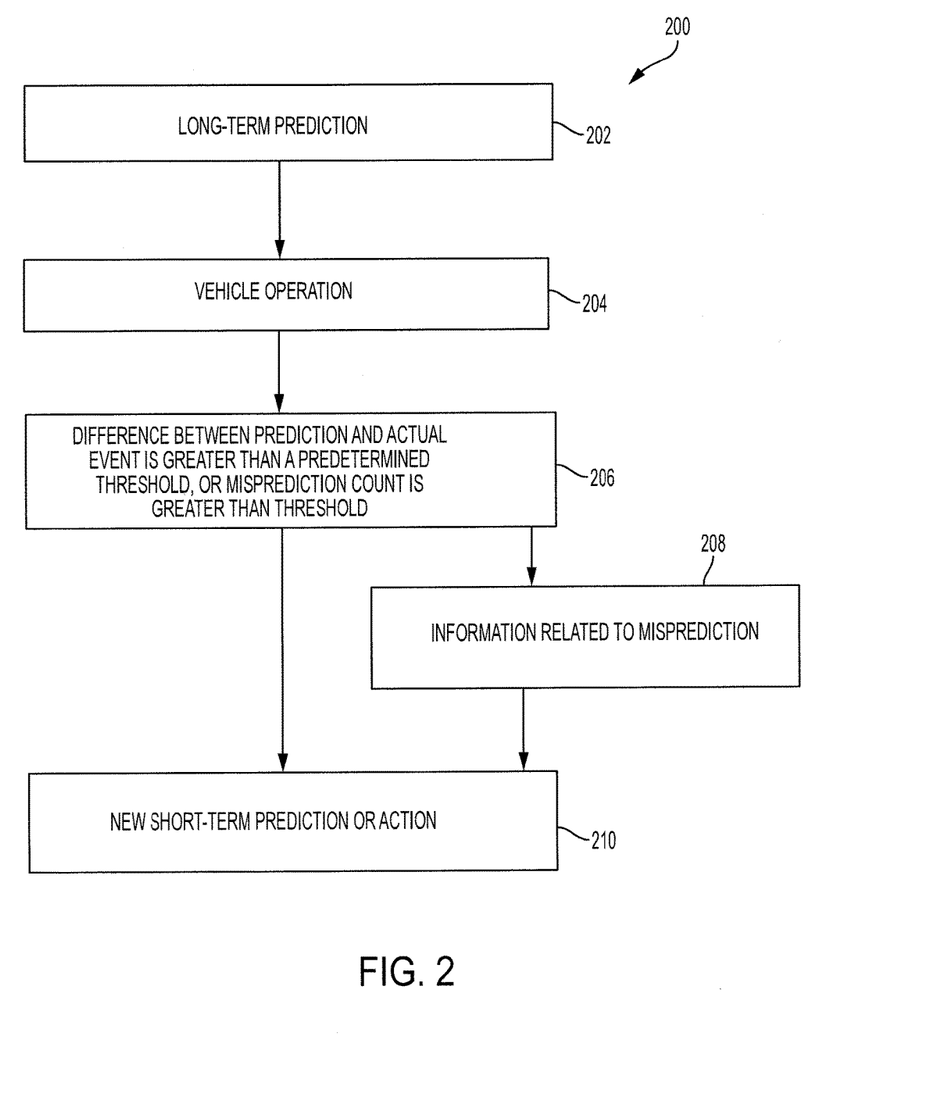
FIG. 2 is a flowchart illustrating a method for increasing efficiency of a vehicle by utilizing missed predictions according to an embodiment of the present invention.

Referring to FIG. 2, a method 200 for accounting for mis-predictions or detection of data indicating that a prediction may be incorrect is shown. For learning and prediction, calculations and memory may be relatively expensive due to storing information for a wide range of scenarios. To alleviate this issue, averages and reduced categorizations may be used. Predictions may also utilize a time window, or "prediction horizon," for determining future controls. At the beginning of a prediction event, the future controls may be relatively locked in in order to gain optimal efficiency. Utilizing the method 200, the vehicle may keep the original control information in order to minimize calculations and data, but may store an additional relatively small subset of information related to learning mis-predictions.

In block 202, an ECU of a vehicle may make a relatively long term prediction corresponding to an event of the vehicle. For example, the ECU may make associations between triggers and events as the vehicle is driven. After a certain number of associations have been determined, the ECU may begin to make predictions based on the associations. For example, if the vehicle accelerates to 65 miles per hour (mph) each time the vehicle reaches a highway on-ramp and this event has occurred a certain number of times (such as 20, 50, 100, or the like) then the ECU may predict that the vehicle will accelerate to 65 mph when the vehicle reaches a highway on-ramp. The ECU may store the trigger (reaching the on-ramp), the predicted event (accelerate to 65 mph), and the action to be performed.

As the vehicle continues to be driven in block 204, the ECU may count how many mis-predictions have occurred and may determine the severity of the mis-predictions. Continuing the example, each time the vehicle reaches an on-ramp and fails to accelerate to 65 mph, the ECU may increase a mis-prediction counter. Furthermore, each time the vehicle fails to accelerate to 65 mph, the ECU may determine to which speed the vehicle accelerates and how far the actual speed is from the predicted 65 mph.

In block 206, the ECU may determine whether the mis-prediction counter reaches or exceeds a threshold quantity of mis-predictions. The threshold quantity of mis-predictions corresponds to a quantity of mis-predictions at which a prediction may be considered to be unreliable for a given situation. The ECU may further determine whether the difference between the prediction and an actual event is greater than a predetermined threshold. The predetermined threshold corresponds to a difference between a predicted event and an actual event that is sufficiently great to indicate that the prediction may be considered to be unreliable. The predetermined threshold may also correspond to a difference that is sufficiently great to indicate that implementation of the stored action will result in relatively large and efficiency.

In block 208, the ECU may receive information that is related to the mis-prediction. For example, the ECU may receive information such as current weather conditions, current traffic conditions, a current time of day, a current location, or the like. This information may be received from a sensor of the vehicle, from the cloud, from one or more nearby vehicles, or the like.

In block 210, the ECU may change a control with regard to the predicted event or the action to be performed when the event is predicted. The change of control may be referred to as a short term change of control because the change may occur in a shorter time frame than the ECU takes to make a long-term prediction such as those in block 202. For example, if 50 iterations are required for the long-term prediction of block 202 to take effect, the change in block 210 may occur after 5 iterations, 10 iterations, or the like.

The change of control may include changing the predicted event that is associated with a given trigger, changing an action that is to be performed when the event is predicted, or changing a prediction horizon of the prediction. These control changes will be discussed in more detail below.

Figure 3A:
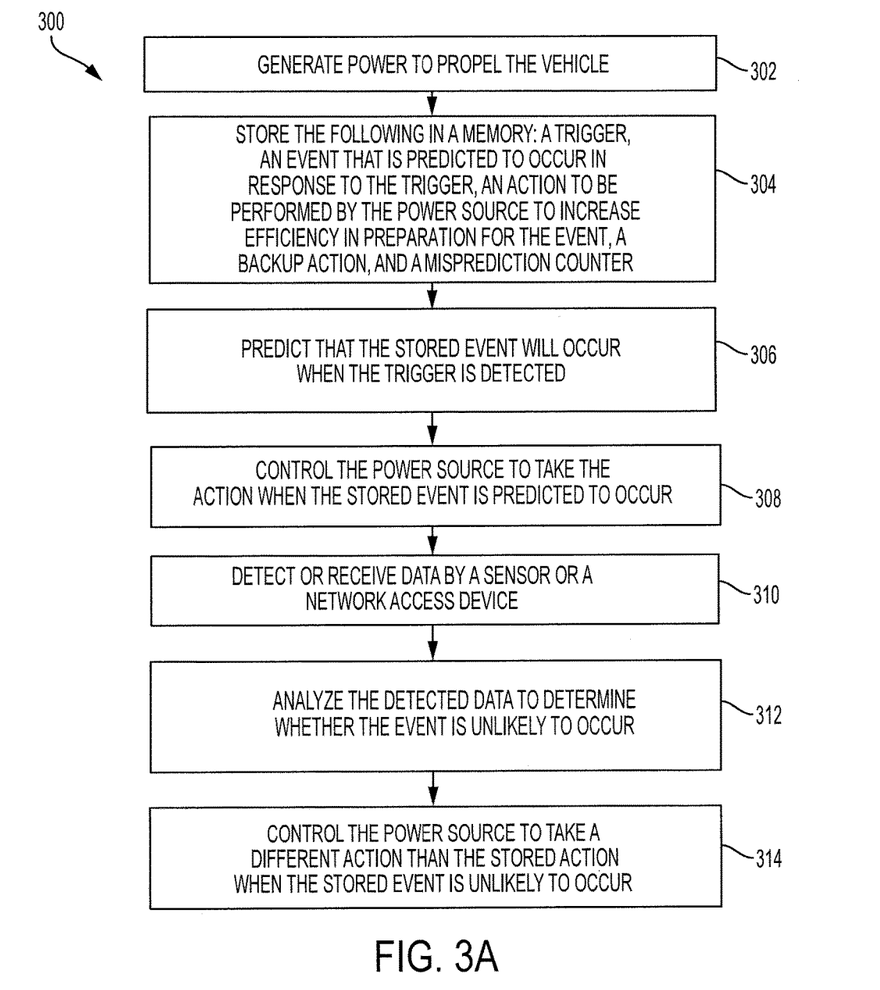
FIGS. 3A and 3B are flowcharts illustrating a method for increasing efficiency of a vehicle by utilizing missed predictions and by supplementing the predictions with additional data detected by various sensors of the vehicle according to an embodiment of the present invention.
Figure 3B:
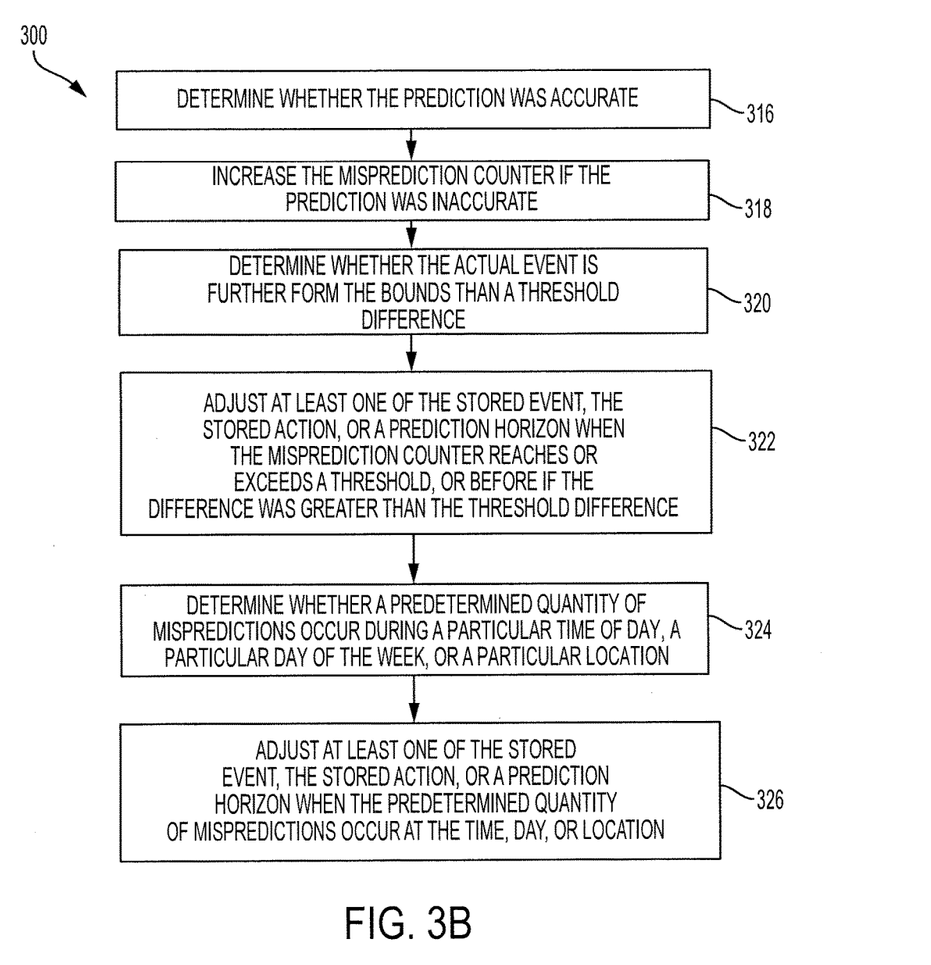

Referring to FIGS. 3A and 3B, a method 300 for improving efficiency of a vehicle, such as the vehicle 100 of FIG. 1, is shown. The method 300 may be performed by components of a vehicle, such as the vehicle 100 of FIG. 1.

In block 302, a power source of the vehicle may generate power to propel the vehicle in a forward or aft direction. The power source may include an engine, a fuel cell, a motor generator with a battery, or the like. In some embodiments, the vehicle may be a hybrid vehicle such that the power source includes an engine and a combination of a battery and a motor generator.

Certain information may be stored in a memory of the vehicle as shown in block 304. For example, the memory may store a plurality of triggers that may be used to predict an upcoming event. Triggers may include, for example, locations, times, requested accelerations, braking actions, or the like.

The memory may also store events that are predicted to occur in response to the triggers. The predicted events may be based on learned behaviors of an individual driver, information referenced from a database or a set of lookup tables, and/or other information. An event may include, for example, an acceleration rate, a braking action, a next segment of a route, a certain vehicle speed, an efficiency of the power source, or the like.

The triggers and the events may be associated in the memory such that an event is predicted to occur when the trigger is detected. For example, a trigger may include an indication that the vehicle is approaching a stop sign and the corresponding event may be that the vehicle decelerates to a stop at the stop sign.

The memory may also store an action to be performed by the power source to increase efficiency in preparation of or during the event. The action may include any action performable by the power source. For example, the action may include turning an engine of a hybrid vehicle on, causing a battery of a vehicle to charge to a predetermined state of charge (SOC), causing a braking operation to begin earlier than requested to optimize results of regenerative braking, or the like.

Continuing the above example, the ECU may predict that the vehicle will decelerate to a stop at the stop sign and may cause the vehicle to begin braking before braking is requested by the driver. Such an action may increase an amount of electrical energy that the motor generator may provide to the battery. As another example, the ECU may control the engine to increase engine speed, without starting the engine, to shorten a ramp-up period for an anticipated acceleration.

The memory may further store at least one of changes to the stored actions or backup options to be implemented in the case that the mis-prediction counter reaches the predetermined quantity or that the predicted events is relatively far from an actual event. In that regard, the information stored in the memory may be used by the ECU to take a different action if the mis-prediction counter reaches the predetermined quantity or if the actual event is sufficiently far from the predicted event.

The memory may store the mis-prediction counter corresponding to a quantity of times a prediction has been inaccurate. The memory may also store additional data corresponding to mis-predictions. For example, the memory may store differences between predicted events and actual event, specific times at which the mis-predictions occurred, specific locations at which the mis-predictions occurred, and the like.

The ECU may continually monitor for triggers. For example, the ECU may monitor data detected by various sensors of the vehicle for detection of triggers. For example, the ECU may monitor location data from a GPS sensor, image data from a camera, radar data from a radar sensor, or the like. In block 306, when a trigger is detected, the ECU may predict that the stored event that is associated with the trigger will occur. For example, the ECU may receive image data corresponding to a stop sign from the camera and may predict that the vehicle will decelerate to a stop by the time the vehicle reaches the stop sign.

In response to predicting that the event will occur, the ECU may control the power source of the vehicle to take the stored action that is associated with the predicted event. For example, the ECU may control the motor generator to begin regenerative braking to convert mechanical power into electrical energy before such braking is requested by the driver.

As mentioned above, certain data detected by the vehicle may indicate that a predicted event is unlikely to occur. For example, conditions may change suddenly when driving, which may make an original prediction unlikely. In that regard and in block 310, the sensors of the vehicle may continuously or periodically detect data corresponding to the environment of the vehicle. For example, the sensors may detect data such as the presence of objects near the vehicle, current weather conditions such as sunshine or moisture, traffic, road construction, or the like.

In some embodiments, the network access device may also or instead receive data from at least one of the cloud or nearby vehicles corresponding to the environment of the vehicle. For example, the network access device may receive weather information from the cloud, may receive data indicating the presence or vehicle speed of nearby vehicles, or the like.

In block 312, the ECU may continuously or periodically analyze the data detected from the various sensors of the vehicle and/or the data received by the network access device. The ECU may analyze the data to determine if any of the data indicates that the predicted event is unlikely to occur.

Various types of data may indicate that various events are unlikely to occur. For example, a traction sensor of the vehicle may detect data indicating that the current traction is relatively low, indicating that a relatively high rate of acceleration is unlikely. As another example, the camera may detect the presence of an object in front of the vehicle, indicating that an acceleration is unlikely and, potentially, that a deceleration is likely. As yet another example, the network access device may receive data from the cloud indicating that vehicles on a highway are traveling at a relatively low speed, indicating that the vehicle may not accelerate to the speed limit of the highway while on an on-ramp to the highway.

In block 314, the ECU may control the power source to take an action other than the stored action when data indicates that the predicted event is unlikely to occur. In some embodiments, the new action taken by the ECU may include taking no action other than that requested by a driver. In some embodiments, the new action may be to cancel the stored action. In some embodiments, the new action may be to delay the prediction. In some embodiments, the ECU may determine a new action to take based on the specifics of the detected data. In some embodiments, the ECU may implement a backup stored action associated with the predicted event.

As an example, the ECU may predict that the vehicle will accelerate to 65 mph while traveling along an on-ramp to a highway. The stored action associated with this prediction is for the ECU to control the power source to begin accelerating prior to reaching the on-ramp in order to increase efficiency by not operating the engine at an engine speed that is greater than an optimal engine speed. The ECU may receive data from a nearby vehicle indicating that the current rate of speed of vehicles on the highway is 45 mph. In that regard, the ECU may implement a new action that delays the acceleration by a certain amount of time so that the engine can accelerate at the optimal engine speed and be traveling at 45 mph at the end of the on-ramp.

As another example, a vehicle may predict an acceleration and preemptively increase engine speed to support such acceleration. However, a sensor of the vehicle may detect a change in condition, such as an animal darting into the lane of the vehicle. The ECU may, at that point, stop increasing the engine speed. When the animal is out of the path of the vehicle, the vehicle may resume the previously predicted acceleration, as originally determined. Alternatively, the vehicle may determine a new acceleration prediction based on any changed conditions and may take an action to preemptively facilitate the newly predicted acceleration.

In block 316, the ECU may determine whether the predicted action was correct. The predicted action may be associated with a set of bounds that define a correct prediction of the stored event. For example, the predicted action may be for the vehicle to accelerate to 65 mph on an on-ramp to a highway. The bounds may be stored in the memory or determined by the ECU. For example, the ECU may determine that any final speed within 10% of 65 mph corresponds to a correct prediction. As another example, the memory may store data indicating that a final speed between 60 mph and 70 mph corresponds to a correct prediction.

In some embodiments, the ECU may change the determined or stored bounds based on collected data. Continuing the above example, if the ECU determines that multiple mis-predictions have occurred that each correspond to final speeds of 59 mph and 71 mph, the ECU may adjust the bounds to include these values. In that regard, the bounds may be from 59 mph to 71 mph, from 58 mph to 72 mph, or the like.

In block 318, the ECU may increase the mis-prediction counter if the prediction was inaccurate. The mis-prediction counter may correspond to a particular predicted event, a group of predicted events, or total predictions by the ECU.

In some embodiments, multiple mis-prediction counters may correspond to a single predicted event and be distinguished by location or time. For example, a predicted action may include that the vehicle will decelerate to a stop when approaching a stop sign. A different mis-prediction counter may be assigned to each particular stop sign location, or a different mis-prediction counter may be assigned to various times throughout the day. In that regard, the ECU may increase a mis-prediction counter corresponding to the stop sign at location A if a mis-prediction occurs at that location and may not increase a mis-prediction counter corresponding to stop signs at other locations.

In block 320, the ECU may determine a difference between the predicted event and an actual occurrence of the event. The ECU may further determine whether the difference is greater than a threshold difference. The threshold difference may correspond to a difference between the predicted event and the actual event that is sufficiently great to warrant reconsideration of the prediction or the action to be taken in response to the predicted event.

For example, the predicted event may be an acceleration to 65 mph on a highway on-ramp. The bounds that define a correct prediction may be from 60 mph to 70 mph. The memory may store, or the ECU may determine, a threshold difference from the predicted event. The threshold difference may be 20 mph. In that regard, if the ECU determines that the actual event is an acceleration to 86 mph then the ECU may determine that the difference is greater than the threshold difference.

In some embodiments, the threshold difference may correspond to a difference between the bounds defining the correct prediction and the actual event. In that regard, the ECU may determine that the difference exceeds the threshold difference when the actual event is an acceleration to 91 mph.

In some embodiments, the threshold difference may be set based on a quantifiable justification. For example, the threshold difference may correspond to values that will reduce fuel consumption of the vehicle by a predetermined amount, such as by 1 mile per gallon (mpg). In that regard, the ECU may determine what difference in acceleration will correspond to a loss of 1 mpg and may set that difference as the threshold difference. In some embodiments, a threshold difference may be set based on other considerations such as a difference in cost between the prediction and the actual event, a difference in emissions between the prediction and the actual event, or the like.

As another example, the threshold may correspond to a difference in time between a predicted duration of an event and an actual duration of an event. For example, if the predicted event is an acceleration from 35 mph to 70 mph over 25 seconds, the threshold difference may correspond to a 2 second difference. In that regard, the threshold difference may be considered to be exceeded if the actual acceleration from 35 mph to 70 mph occurs over 28 seconds.

In block 322, the ECU may take an action when at least one of the mis-prediction counter reaches a threshold quantity, or the difference between the predicted event and the actual event is greater than the threshold difference. In some embodiments, multiple mis-prediction counters may correspond to the predicted event such that each mis-prediction counter corresponds to a different severity of mis-predictions. For example, a first mis-prediction counter may correspond to mis-predictions that are within 20% of the predicted event and a second mis-prediction counter may correspond to mis-predictions that are greater than 20% away from the predicted event. The threshold quantity of mis-predictions may be different for each mis-prediction counter. For example, the threshold quantity of mis-predictions for mis-predictions within 20% of the predicted event may be 10, and the threshold quantity of mis-predictions for mis-predictions farther than 20% away from the predicted event may be 3 due to the relative severity of these mis-predictions.

The actions taken by the ECU may vary based on the predicted event, the severity of the mis-prediction, the frequency of mis-predictions, what type of mis-prediction occurred, or the like. The actions may include adjusting the stored event that is predicted to occur, adjusting the stored action to be performed in response to the prediction, or adjusting a prediction horizon of the prediction.

Adjusting the stored event includes changing the prediction of what will occur when the corresponding trigger is detected. For example, the predicted event may include accelerating to 65 mph when the vehicle approaches a highway on-ramp. After several iterations of the vehicle accelerating to 75 mph when approaching the on-ramp, the mis-prediction counter may reach the threshold quantity.

When the mis-prediction counter reaches the threshold quantity, the ECU may change the predicted event corresponding to the trigger of approaching the on-ramp. For example and potentially depending on a quantity of correct predictions, the ECU may change the predicted event to be an acceleration to a speed that is between 65 mph and 75 mph.

Adjusting the stored action includes adjusting the action to be performed when the particular event is predicted to occur. Adjusting the stored action may further include canceling the stored action. Continuing the above example, the action to be taken in response to predicting the acceleration to 65 mph may include turning on an engine early to charge a battery with sufficient power to supplement the engine power during the acceleration. After the mis-prediction counter reaches the threshold quantity, the ECU may change this action. For example, because the actual final speeds are greater than the predicted final speed, the ECU may control the engine to turn on even earlier in order to provide extra charge to the battery prior to the acceleration.

Adjusting the prediction horizon includes shortening or lengthening an amount of time to which a prediction applies. For example, the predicted event may include the vehicle coasting at 65 mph upon reaching a highway. The prediction may apply to the entire time the vehicle is on a highway. After numerous iterations, the mis-prediction counter may reach the threshold quantity due to the vehicle traveling at 75 mph on a particular stretch of the highway. The ECU may change the prediction horizon of the prediction to correspond to only the portion of the highway at which the vehicle has traveled at 65 mph. The ECU may then create a new trigger corresponding to the location at which the vehicle travels at 75 mph, and may create a new prediction that the vehicle will travel at 75 mph on the corresponding stretch of highway.

In block 324, the ECU may analyze mis-predictions to determine whether a predetermined quantity of mis-predictions occur during a particular time of day, a particular day of the week, a particular location, or other item that may affect normal control of the vehicle such as snowy conditions or clear conditions. The predetermined quantity of mis-predictions at the time, day, or location corresponds to a quantity at which it is obvious that the prediction is affected by the particular time, day, or location.

For example, for each mis-prediction, the memory may store data in the memory indicating a time and/or a location at which the mis-prediction occurred. Continuing the above example, the memory may store the location at which the vehicle begins traveling at 75 mph. As another example, the ECU may note times at which a vehicle accelerates to a speed below 65 mph while traveling along a highway on-ramp, likely corresponding to rush hours.

In block 326, the ECU may adjust at least one of the stored event, the stored action, or a prediction horizon when the predetermined quantity of mis-predictions occurs at the time, the day, or the location. These adjustments may be performed in a similar manner as described above with reference to block 322.

For example, the vehicle may accelerate to 45 mph while traveling along a highway on-ramp at times between 5 PM and 6 PM. After the predetermined quantity of mis-predictions occurs at this time, the ECU may change the predicted event to correspond to times other than between 5 PM and 6 PM. The ECU may further create a new predicted event corresponding to the highway on-ramp at times between 5 PM and 6 PM. The ECU may create an action to be performed that corresponds to the slower acceleration.

Figure 4:
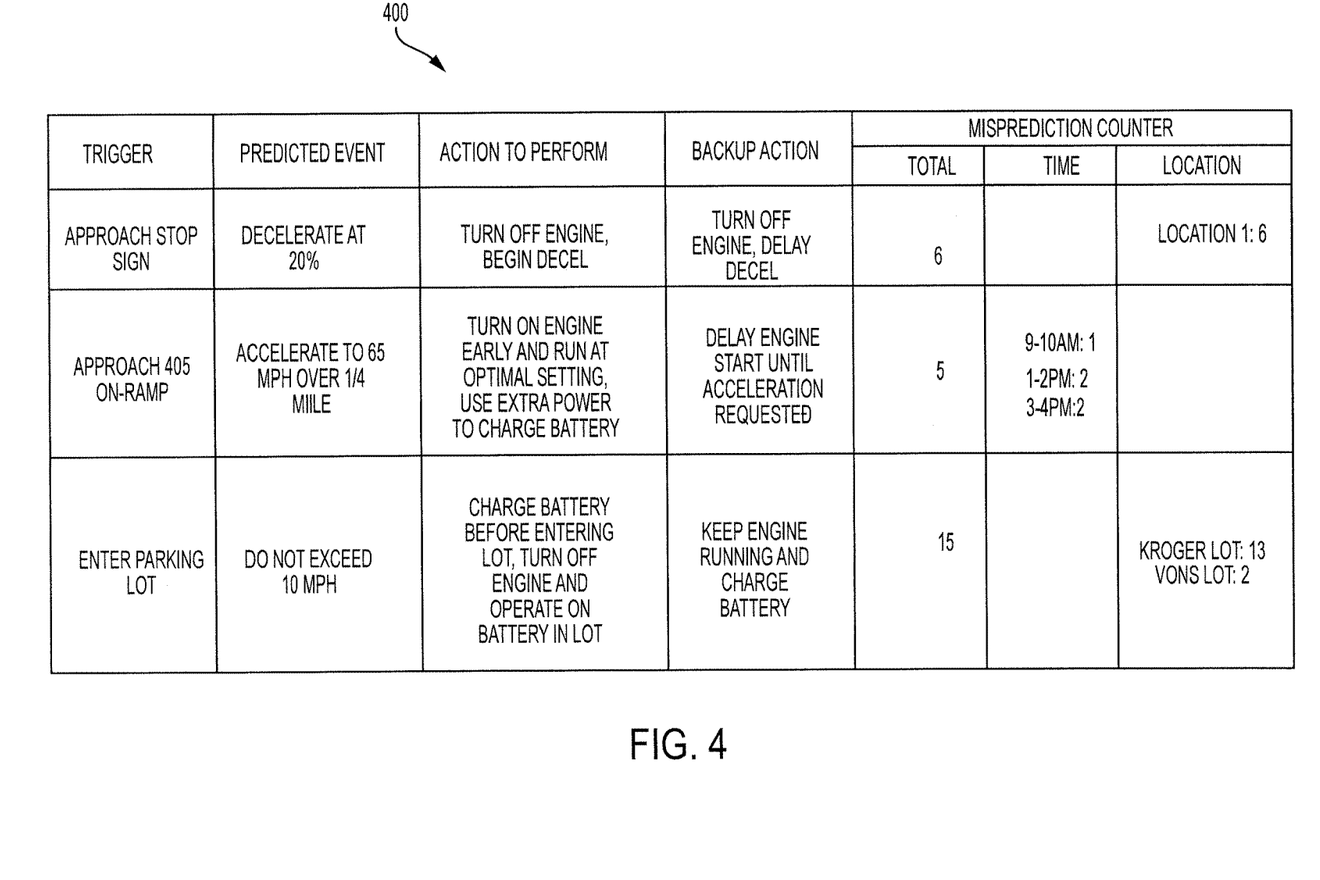
FIG. 4 is a drawing illustrating an exemplary database for storing various information usable by a vehicle to increase efficiency based on missed predictions according to an embodiment of the present invention.

Turning to FIG. 4, an exemplary database 400 illustrates data that may be stored by a memory of a vehicle, such as the memory 104 of FIG. 1. As shown, the memory may store a plurality of triggers, a plurality of predicted events corresponding to the trigger, actions to be performed in response to predicting the event, along with backup actions. The memory may further store a mis-prediction counter for each of the triggers, and may store additional information corresponding to the times or locations at which the mis-predictions occur.

Figure 5:
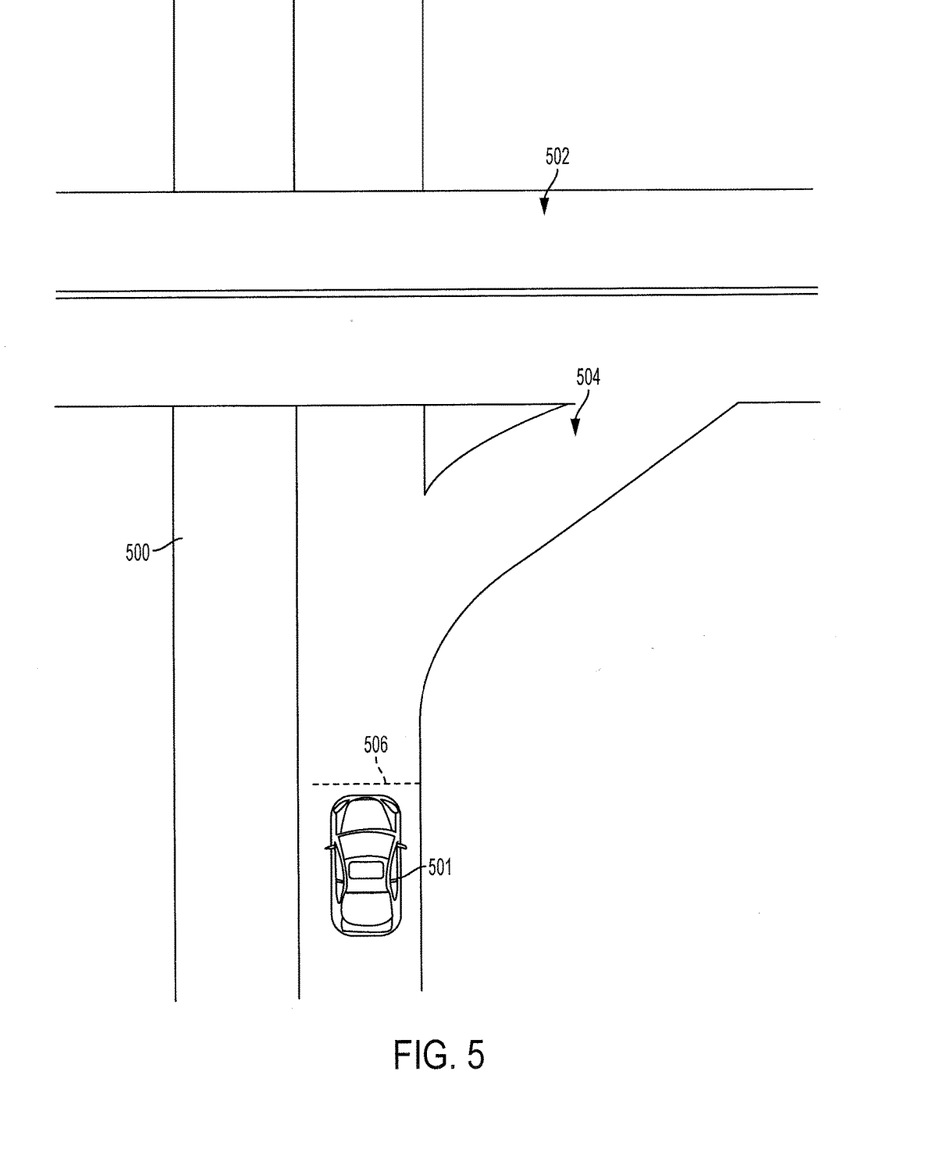
FIG. 5 is a drawing of a vehicle on a road utilizing the information stored in the database of FIG. 4 in order to increase vehicle efficiency according to an embodiment of the present invention.

Referring to FIGS. 4 and 5, an exemplary use of the database 400 is shown. A vehicle 501 having similar features as the vehicle 100 of FIG. 1 is traveling along a country road 500 and approaching an on-ramp 504 to the 405 highway 502. As shown in the database 400, the memory has a trigger stored of approaching the 405 on-ramp 504.

The predicted event corresponding to the example shown in FIG. 5 is that the vehicle will accelerate to 65 mph over the quarter-mile distance of the on-ramp 504. The memory further stores a corresponding action to be performed when the event is predicted. In particular, the action is that the ECU will turn on the engine early (at a location 506) and cause it to run at an optimal engine speed and torque, using the extra power initially to charge the battery. The purpose of this action is to allow the engine to continue to run at the optimal settings while supplementing the power for the acceleration with energy stored in the battery.

As the vehicle 501 reaches the location 506, the ECU may control the engine to turn on and operate at the optimal engine speed and torque. As the vehicle 501 enters the highway 502, the ECU may determine whether the actual vehicle speed is within the bounds that define the predicted event. For example, the ECU may determine whether the actual vehicle speed is between 60 mph and 70 mph. If the actual vehicle speed is less than 60 mph or greater than 70 mph, the ECU may increase the mis-prediction counter such that the mis-prediction counter for the corresponding event increases to 6 mis-predictions. Furthermore, the ECU may store data corresponding to the time at which the mis-prediction occurred. The ECU may also store information corresponding to the severity of the mis-prediction, and whether the mis-prediction was too low or too high.

When the mis-prediction counter reaches the threshold quantity of mis-predictions, the ECU may cause the backup action to occur upon a subsequent prediction of the event. For example, as the vehicle 501 approaches the on-ramp 504 during a subsequent trip, the ECU may allow the engine of the vehicle 501 to remain off until acceleration is requested by the driver.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for improving vehicle efficiency of a vehicle comprising:
   a power source configured to generate power usable to propel the vehicle;
   a memory configured to store:
      an event that is predicted to occur,
      an action to be performed by the power source to increase efficiency of the power source during the stored event, and
      a mis-prediction counter corresponding to a quantity of times a prediction of the stored event was incorrect; and
   an electronic control unit (ECU) coupled to the power source and the memory and configured to:
      predict that the stored event will occur,
      control the power source to take the action when the stored event is predicted to occur,
      increase the mis-prediction counter if the prediction was inaccurate, and
      adjust at least one of the stored event that is predicted to occur, the stored action to be performed by the power source, or a prediction horizon of the prediction when the mis-prediction counter reaches or exceeds a threshold quantity of mis-predictions in order to increase the efficiency of the power source during a subsequent prediction of the stored event.

2. The system of claim 1 wherein the ECU is further configured to determine whether the prediction of the stored event was accurate by determining whether an actual event fits within a set of bounds defining a correct prediction of the stored event.

3. The system of claim 2 wherein the ECU is further configured to:
   determine whether the actual event is further from the set of bounds than a threshold difference when the prediction is inaccurate; and
   adjust at least one of the stored event that is predicted to occur, the stored action to be performed by the power source, or the prediction horizon of the prediction when the mis-prediction counter is below the threshold quantity of mis-predictions and the actual event is further from the set of bounds than the threshold difference.

4. The system of claim 1 further comprising a sensor configured to detect data corresponding to an environment of the sensor, wherein the ECU is further configured to:
   analyze the detected data to determine whether the detected data indicates that the stored event is unlikely to occur, and
   control the power source to take a different action than the stored action in response to determining that the stored event is unlikely to occur.

5. The system of claim 4 wherein:
   the stored event is an acceleration rate;
   the sensor includes at least one of a camera, a radar, or a Light Detection and Ranging (LIDAR) configured to detect a presence of an object in a path of the sensor; and
   the different action includes at least one of preparing the power source to provide less than the stored acceleration rate or causing the power source to delay acceleration based on detection of the presence of the object.

6. The system of claim 1 further comprising:
   a battery having a state of charge (SOC) and configured to store electrical energy;
   a motor-generator coupled to the battery and configured to convert the electrical energy into mechanical power and vice versa; and
   an engine having an optimal operating torque and engine speed corresponding to an optimal efficiency of the engine and configured to convert fuel into mechanical power,
   wherein the stored event is an acceleration rate, and the action is to cause the engine to operate at the optimal operating torque and engine speed prior to the acceleration rate being requested in order to increase the SOC of the battery so that the motor-generator and the engine can provide sufficient mechanical power to provide the acceleration rate without the engine operating outside of the optimal operating torque and engine speed.

7. The system of claim 1 wherein the stored event is at least one of an acceleration rate over a predetermined distance or amount of time, a velocity of the vehicle after the predetermined distance or amount of time, or the efficiency of the power source over the predetermined distance or amount of time.

8. The system of claim 1 wherein the memory is further configured to store a backup action to be performed by the power source to increase the efficiency of the power source during the stored event, and the ECU is further configured to control the power source to take the backup action when the stored event is predicted to occur and the mis-prediction counter reaches or exceeds the threshold quantity of mis-predictions.

9. The system of claim 1 wherein the ECU is further configured to determine whether a predetermined quantity of mis-predictions occur during a particular time of day or a particular location and to adjust at least one of the stored event that is predicted to occur, the stored action to be performed by the power source, or the prediction horizon of the prediction for only the particular time of day or the particular location when the predetermined quantity of mis-predictions occur during the particular time of day or at the particular location.

10. A method for improving vehicle efficiency of a vehicle comprising:
generating, by a power source, power to propel the vehicle;
storing, in a memory:
an event that is predicted to occur,
an action to be performed by the power source to increase efficiency of the power source during the stored event, and
a mis-prediction counter corresponding to a quantity of times a prediction of the stored event was incorrect;
predicting, by an electronic control unit (ECU), that the stored event will occur;
controlling, by the ECU, the power source to take the action when the stored event is predicted to occur;
increasing, by the ECU, the mis-prediction counter if the prediction was inaccurate; and
adjusting, by the ECU, at least one of the stored event that is predicted to occur, the stored action to be performed by the power source, or a prediction horizon of the prediction when the mis-prediction counter reaches or exceeds a threshold quantity of mis-predictions in order to increase the efficiency of the power source during a subsequent prediction of the stored event.

11. The method of claim 10 further comprising:
determining, by the ECU, whether the prediction of the stored event was accurate by determining whether an actual event fits within a set of bounds defining a correct prediction of the stored event;
determining, by the ECU, whether the actual event is further from the set of bounds than a threshold difference when the prediction is inaccurate; and
adjusting, by the ECU, at least one of the stored event that is predicted to occur, the stored action to be performed by the power source, or the prediction horizon of the prediction when the mis-prediction counter is below the threshold quantity of mis-predictions and the actual event is further from the set of bounds than the threshold difference.

12. The method of claim 10 further comprising:
detecting, by a sensor, data corresponding to an environment of the sensor;
analyzing, by the ECU, the detected data to determine whether the detected data indicates that the stored event is unlikely to occur; and
controlling, by the ECU, the power source to take a different action than the stored action in response to determining that the stored event is unlikely to occur.

13. The method of claim 12 wherein:
the stored event is an acceleration rate;
the sensor includes at least one of a camera, a radar, or a Light Detection and Ranging (LIDAR) configured to detect a presence of an object in a path of the sensor; and
controlling the power source to take the different action includes at least one of preparing the power source to provide less than the stored acceleration rate or causing the power source to delay acceleration based on detection of the presence of the object.

14. The method of claim 10 further comprising:
storing, in a battery having a state of charge (SOC), electrical energy;
converting, by a motor-generator, the electrical energy into mechanical power and vice versa;
converting, by an engine having an optimal operating torque and engine speed corresponding to an optimal efficiency, fuel into mechanical power,
wherein:
the stored event is an acceleration rate, and
the action is to cause the engine to operate at the optimal operating torque and engine speed prior to the acceleration rate being requested in order to increase the SOC of the battery so that the motor-generator and the engine can provide sufficient mechanical power to provide the acceleration rate without the engine operating outside of the optimal operating torque and engine speed.

15. The method of claim 10 wherein the stored event is at least one of an acceleration rate over a predetermined distance or amount of time, a velocity of the vehicle after the predetermined distance or amount of time, or the efficiency of the power source over the predetermined distance or amount of time.

16. The method of claim 10 further comprising:
storing, by the memory, a backup action to be performed by the power source to increase the efficiency of the power source during the stored event; and
controlling, by the ECU, the power source to take the backup action when the stored event is predicted to occur and the mis-prediction counter reaches or exceeds the threshold quantity of mis-predictions.

17. The method of claim 10 further comprising:
determining, by the ECU, whether a predetermined quantity of mis-predictions occur during a particular time of day or a particular location; and
adjusting at least one of the stored event that is predicted to occur, the stored action to be performed by the power source, or the prediction horizon of the prediction for only the particular time of day or the particular location when the predetermined quantity of mis-predictions occur during the particular time of day or at the particular location.

18. A system for improving vehicle efficiency of a vehicle comprising:
a power source configured to generate power usable to propel the vehicle;
a sensor configured to detect data corresponding to an environment of the sensor;
a memory configured to store:
a trigger,
an event that is predicted to occur when the trigger occurs,
an action to be performed by the power source to increase efficiency of the power source during the stored event, and
a mis-prediction counter corresponding to a quantity of times a prediction of the stored event was incorrect; and
an electronic control unit (ECU) coupled to the power source, the sensor, and the memory and configured to:
predict that the stored event will occur when the trigger occurs,
control the power source to take the action when the stored event is predicted to occur,
analyze the detected data to determine whether the detected data indicates that the stored event is unlikely to occur,
control the power source to take a different action than the stored action in response to determining that the stored event is unlikely to occur, determine whether the prediction of the stored event was accurate by determining whether an actual event fits within a set of bounds defining a correct prediction of the stored event, increase the mis-prediction counter if the prediction was inaccurate, and adjust at least one of the stored event that is predicted to occur, the stored action to be performed by the power source, or a prediction horizon of the prediction when the mis-prediction counter reaches or exceeds a threshold quantity of mis-predictions in order to increase the efficiency of the power source after a subsequent detection of the trigger.

19. The system of claim 18 wherein the ECU is further configured to:

determine whether the actual event is further from the set of bounds than a threshold difference when the prediction is inaccurate; and adjust at least one of the stored event that is predicted to occur, the stored action to be performed by the power source, or the prediction horizon of the prediction when the mis-prediction counter is below the threshold quantity of mis-predictions and the actual event is further from the set of bounds than the threshold difference.

20. The system of claim 18 further comprising:

a battery having a state of charge (SOC) and configured to store electrical energy;

a motor-generator coupled to the battery and configured to convert the electrical energy into mechanical power and vice versa; and an engine configured to convert fuel into mechanical power and having an optimal operating torque and engine speed corresponding to an optimal efficiency of the engine, wherein the stored event is an acceleration rate, and the action is to cause the engine to operate at the optimal operating torque and engine speed prior to the acceleration rate being requested in order to increase the SOC of the battery so that the motor-generator and the engine can provide sufficient mechanical power to provide the acceleration rate without the engine operating outside of the optimal operating torque and engine speed.

* * * * *